United States Patent
MacDonald et al.

(10) Patent No.: US 11,439,163 B2
(45) Date of Patent: *Sep. 13, 2022

(54) COLORED BEVERAGE HAVING A LOW PH

(71) Applicant: GNT GROUP B.V., Mierlo (NL)

(72) Inventors: Jane Lee MacDonald, New York, NY (US); Elena Leeb, Aachen (DE)

(73) Assignee: GNT GROUP B.V., Mierlo (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/423,511

(22) PCT Filed: Nov. 19, 2019

(86) PCT No.: PCT/EP2019/081792
§ 371 (c)(1),
(2) Date: Jul. 16, 2021

(87) PCT Pub. No.: WO2020/148003
PCT Pub. Date: Jul. 23, 2020

(65) Prior Publication Data
US 2022/0039434 A1     Feb. 10, 2022

(30) Foreign Application Priority Data

Feb. 11, 2019  (EP) ..................... 19156394
Feb. 11, 2019  (EP) ..................... 19156427
(Continued)

(51) Int. Cl.
*A23L 2/58*  (2006.01)
*A23L 5/46*  (2016.01)
(Continued)

(52) U.S. Cl.
CPC ............... *A23L 2/58* (2013.01); *A23L 2/02* (2013.01); *A23L 2/44* (2013.01); *A23L 2/46* (2013.01);
(Continued)

(58) Field of Classification Search
CPC . A23L 2/58; A23L 5/46; A23L 29/256; A23L 2/68; C12G 3/04; A23V 2002/00
(Continued)

(56) References Cited

U.S. PATENT DOCUMENTS 8,747,900 B2 *  6/2014  Ziegler et al.
2011/0070336 A1   3/2011  Mutilangi et al.
(Continued)

FOREIGN PATENT DOCUMENTS

WO      2018134390 A1   7/2018

OTHER PUBLICATIONS

Foodsweeteners, Carageenan E407 . . . Newseed https://qqq.foodsweeteners.com, pp. 1-24. (Year: 2018).*
(Continued)

*Primary Examiner* — Helen F Heggestad
(74) *Attorney, Agent, or Firm* — Hudak, Shunk & Farine Co. LPA

(57) ABSTRACT

A liquid foodstuff comprising a. a spirulina-extract comprising phycocyanin, b. at least one multi-sulphated carrageenan and c. a solvent, wherein the amount of multi-sulphated carrageenan is between 0.005 and 0.6 wt %, wherein the weight ratio between multi-sulphated carrageenan and phycocyanin ranges between 1.5:1 and 200:1, wherein the liquid foodstuff has a pH between 2.0-4.6, preferably 2.2-4.0, more preferably 2.3-3.6, most preferably 2.4-3.3, wherein the solvent consists of water and optionally ethanol, wherein the amount of solvent ranges between 75-99 wt %, wherein the wt % are relative to the total weight of the liquid foodstuff.

21 Claims, 2 Drawing Sheets

(30) Foreign Application Priority Data

Feb. 11, 2019 (EP) .................................. 19156440
Feb. 11, 2019 (EP) .................................. 19156444

(51) Int. Cl.
| | |
|---|---|
| A23L 29/256 | (2016.01) |
| A23L 2/02 | (2006.01) |
| A23L 2/68 | (2006.01) |
| A23L 2/84 | (2006.01) |
| C12G 3/04 | (2019.01) |
| A23L 29/231 | (2016.01) |
| A23L 2/44 | (2006.01) |
| A23L 2/46 | (2006.01) |

(52) U.S. Cl.
CPC .......... *A23L 2/68* (2013.01); *A23L 2/84* (2013.01); *A23L 5/46* (2016.08); *A23L 29/231* (2016.08); *A23L 29/256* (2016.08); *C12G 3/04* (2013.01); *A23V 2002/00* (2013.01)

(58) Field of Classification Search
USPC ................. 426/250, 615, 573, 590, 540, 575
See application file for complete search history.

(56) References Cited

U.S. PATENT DOCUMENTS

| | | |
|---|---|---|
| 2015/0201635 A1 | 7/2015 | Graf et al. |
| 2018/0271119 A1 | 9/2018 | Cagnac |

OTHER PUBLICATIONS

Buchweitz, "Natural Solutions for Blue Colors in Food", Handbook on Natural Pigments in Food and Beverages, 2016, pp. 355-384, vol. 17, Woodhead Publishing.
Singh, "Kinetics of acid hydrolysis of κ—carrageenan as determined by molecular weight (SEC-MALLSRI), gel breaking strength, and viscosity measurements", Carbohydrate Polymers, 1994, pp. 89-103, vol. 23, Elsevier Science Limited.
Yoshikawa, "Single-Laboratory Validation of a Method for the Determination of $_c$—Phycocyanin and Allophycocyanin in Spirulina (Arthrospira) Supplements and Raw Materials by Spectrophotometry", Journal of AOAC International, 2008, pp. 524-529, vol. 91, No. 3.
Selig Michael J et al: "Protection of blue color in a spirulina derived physocyanin extract from proteolytic and thermal degradation via complexation with beet-pectin", Food Hydrocolloids, Jul. 28, 2017, pp. 46-52, vol. 74, Elsevier BV, NL.
Eko Nuracahya et al: "Physical Properties of Spirulina Phycocyanin Microencapsulated with Maltodextrin and Carrageenan", Philippine Journal of Science, Jun. 1, 2018, pp. 201-207, vol. 147, Philippines.
Ratana Chaiklahan et al: "Stability of phycocyanin extracted from *Spirulina* sp: Influence of temperature, PH and preservatives", Process Biochemistry, Apr. 1, 2012, pp. 659-664, vol. 47, No. 4, Elsevier Ltd.
Giulia Martelli et al: "Thermal stability improvement of blue colorant C-phycocyanin from Spirulina platensis for food industry applications", Process Biochemistry, Jan. 1, 2014, pp. 154-159, vol. 49 No. 1, Elsevier Ltd.
Prajapativipul D et al: "Carrageenan: A natural seaweed polysaccharide and its applications", Carbohydrate Polymers, Jan. 30, 2014, pp. 97-112, vol. 105, Elsevier Ltd.
Jespersen et al: "Heat and light stability of three natural blue colorants for use in confectionery and beverages", European Food Research and Technology, Springer Berlin Heidelberg, Mar. 1, 2005, pp. 261-266 vol. 220, No. 3-4, Springer-Verlag.
Sonda Benelhadj et al: "Effect of pH on the functional properties of Arthrospira (Spirulina) platensis protein isolate", Food Chemistry, Aug. 31, 2015, pp. 1056-1063, vol. 194, Elsevier Ltd.
Dewi et al:"Physical Characteristics of Phycocyanin from Spirulina Microcapsules using Different Coating Materials with Freeze Drying Method", 2nd Int'l Conf. Tropical and Coastal Region Eco Dev., 2016, IOP Conf Series: Earth and Envirn. Sci 55, 2017, 012060, IOP Publishing Ltd.

* cited by examiner

COLORED BEVERAGE HAVING A LOW PH

FIELD OF THE INVENTION

The present invention relates to a color stabilized liquid foodstuff containing a phycocyanin from spirulina-extract.

BACKGROUND OF THE INVENTION

Beverages and colored beverages are known in the art. The use of natural food pigments over synthetic ones has increased in the food industry, due to increased consumer demands. While several natural pigments have been applied to high acid beverages, having a pH less than 4.6, there is a need for a stable blue pigment which can be used on its own or blended with other pigments to deliver a range of colors including but not limited to green, purple, brown, and black.

US2018271119 discloses the use of phycocyanin derived from *Galdieria sulphuraria*, which is capable of growing at both high temperature and low pH, for use in beverages. The increased acid stability of phycocyanin (and allophycocyanin) extracted from *Galdieria sulphuraria* might be explained by the differences in the amino acid sequence in comparison to phycocyanin from commercially available spirulina (such as *Arthrospira platensis, Arthrospira maxima*, ect.). But *Galdieria sulphuraria* phycocyanin extracts have not yet been approved or undergone long term testing, as *Spirulina* derived phycocyanin has.

Selig, et at. Food hydrocolloids 2017, discloses the use of beet-pectin to stabilize phycocyanin from a *Spirulina* extract at pH 6.8 in an aqueous solution. Beet-pectin appears to be effective at pH 6.8, but not at lower pHs and thus could not be used for high acid beverages.

Dewi, et al. IOP conf Ser earth Environ Sci 55 (2017) discloses a spirulina extract encapsulated in κ-carrageenan for use in an aqueous solution.

Phycocyanin, from a *Spirulina* extract, is to-date the only natural blue pigment approved by the US-FDA (FR Doc No: 2013-19550) and European Union as a coloring food. It is sold in liquid or in powder form for use as blue pigment in foods. Phycocyanin, however, has the disadvantage of being unstable at acidic pH, below 4.6, leading to loss of color and to precipitation which limits the use of phycocyanin. Thus, phycocyanin cannot be used for its food coloring properties in beverages, such as in for example carbonated or non-carbonated drinks, which can be acidic. Health conscious customers demand a wide range of naturally colored beverages, and phycocyanin is to-date the only available natural blue pigment. Hence, there is a need to stabilize phycocyanin at acidic pH.

SUMMARY OF THE INVENTION

The inventors have found a solution to stabilize the blue color, from a phycocyanin containing spirulina-extract, in acidic liquid foodstuffs.

The present invention relates to a liquid foodstuff comprising
a. a spirulina-extract comprising phycocyanin,
b. at least one multi-sulphated carrageenan and
c. a solvent,
   wherein the amount of multi-sulphated carrageenan is between 0.005 and 0.6 wt %,
   wherein the weight ratio between multi-sulphated carrageenan and phycocyanin ranges between 1.5:1 and 200:1,
   wherein the liquid foodstuff has a pH between 2.0-4.6, preferably 2.2-4.0, more preferably 2.3-3.6, most preferably 2.4-3.3,
   wherein the solvent consists of water and optionally ethanol,
   wherein the amount of solvent ranges between 75-99 wt %,
   wherein the wt % are relative to the total weight of the liquid foodstuff.

The liquid foodstuff according to the invention has an increased color stability over the heating process as well as storage duration and solves one or more of the compounding negative effects of the acidic condition on the blue color of the liquid foodstuff. The negative effects are aggregation/precipitation, color fading, color hue changes and lack of color stability over time (weeks or months), as foodstuffs need to withstand long transport and varying storage conditions.

Advantages of the liquid foodstuff according to the invention are color stability and prevention of aggregation/precipitation; thereby enabling beverages to be naturally colored; for example, in blue and blue-based colors.

DETAILED DESCRIPTION OF THE INVENTION

Figure 1:
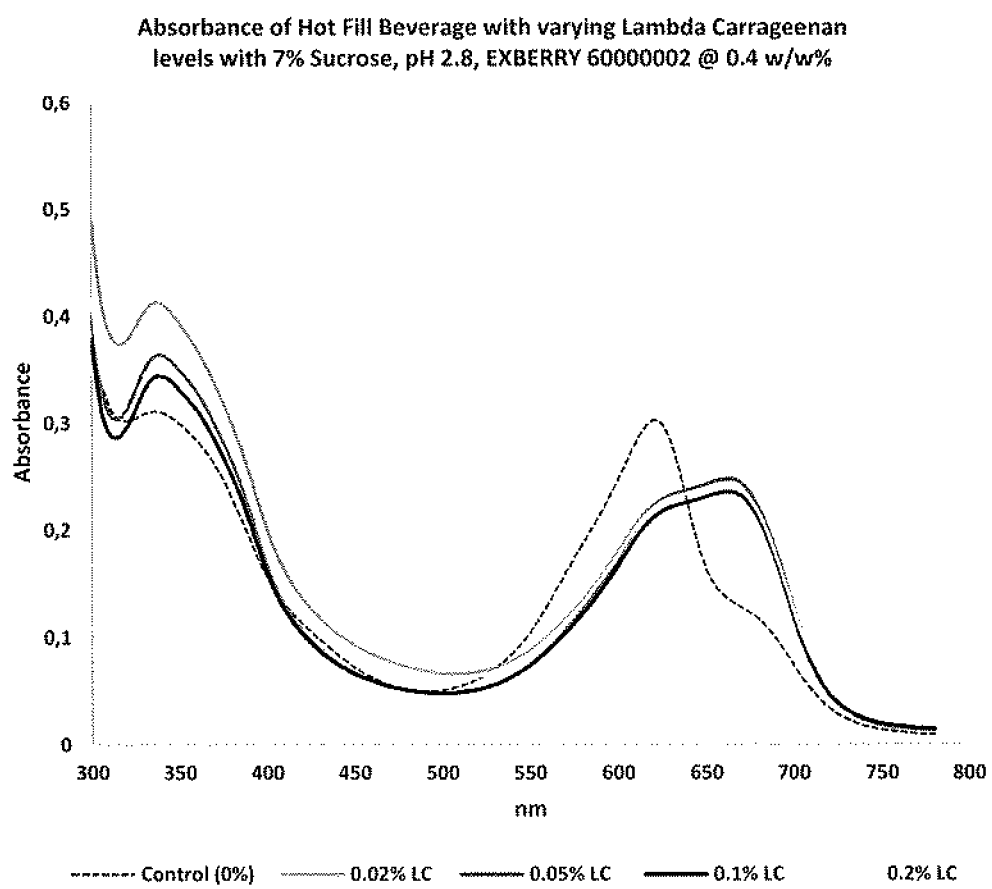
FIG. 1: Photometric analysis of beverage model system (pH 2.8) without and with the addition of 0.02-0.2 wt. % λ-carrageenan. The shape of the curve and shift of the visible peak maximum to 660-670 nm stayed consistent with each dosage level of λ-carrageenan. The shift in the photometric curve was surprising and suggests that λ-carrageenan is binding with the phycocyanin in acidic conditions.

The liquid foodstuff of the invention contains multi-sulphated-carrageenan, a phycocyanin containing spirulina-extract and has a pH between 2.0-4.6, preferably 2.2-4.0, more preferably 2.3-3.6, most preferably 2.4-3.3.

The liquid foodstuff preferably has a solvent content of 75-99 wt. %, more preferably between 80-98 wt. %, most preferably between 83-97 wt. %. The solvent consists of water and optionally ethanol (ethylalcohol). When ethanol is present typically, the liquid foodstuff contains between 0.1-40 wt %, preferably between 0.5-20 wt. %, more preferably between 1-15 wt. %, most preferably between 3-10 wt. % ethanol.

The wt. % is defined as the weight % of a component relative to the total weight of the liquid foodstuff, unless defined otherwise.

Preferably the liquid foodstuff is a beverage, such as a juice, juice drink, sports drink, flavored tea, flavored water, carbonated beverage, non-carbonated beverage, nutritional drink, and/or alcoholic beverage such as cider and malt beverage.

The liquid foodstuff's color can be required to be stable over a long period of time (through transport and storage over weeks or months), at low pH. The color also needs to be stable after the liquid food product is subject to high temperature, up to 120° C., as these temperatures are commonly used in the food industry in processes such as high temperature short time pasteurization to ensure food safety.

Phycocyanin

The liquid foodstuff contains a phycocyanin containing spirulina-extract.

The phycocyanin containing spirulina-extract can be a water extract of for example *Arthrospira platensis* and *Arthrospira maxima*. Spirulina is a cyanobacteria that contains carbohydrates, lipids, fiber, minerals and amongst other proteins, phycobiliproteins. The phycobiliproteins comprise of C-phycocyanin and allophycocyanin. Phycocyanins exhibit the blue color of the liquid foodstuffs according to the present invention. The total phycocyanin content (which is the sum of the C-phycocyanin and allophycocyanin) in phycocyanin containing spirulina-extracts may vary by manufacturers and may typically range from 0.7-45.0 wt. %. It is also possible to apply higher concentrations of phycocyanins. The phycocyanin containing spirulina-extract may also be known as Spirulina color concentrate, as for example EXBERRY® Shade Blue Powder. The phycocyanin containing spirulina-extract may be in liquid or dry (powder or granule) form and may contain diluents such as water, invert sugar, sucrose, and/or maltodextrin as example. For use in this invention, liquid and dry forms of phycocyanin containing spirulina-extract are applicable.

The liquid foodstuff preferably contains a dissolved phycocyanin from a spirulina-extract.

Multi-Sulphated Carrageenan

The liquid foodstuff contains a multi-sulphated carrageenan or combination of multi-sulphated carrageenan.

The liquid foodstuff preferably contains dissolved multi-sulphated carrageenan. Carrageenans are viewed as dissolved, when an aqueous solution is clear to the eye, and does not show sediment or floating particulates.

Carrageenans are sourced from seaweed and they are highly flexible molecules that can form curling helical structures. Carrageenans are characterized as linear polysaccharides with repeating galactose units. Carrageenans are classified by the degree of sulfonation. Examples of mono-sulphated carrageenans are κ-carrageenan, γ-carrageenan and α-carrageenan. Examples of di-sulphated carrageenans are ι-carrageenan, δ-carrageenan, μ-carrageenan and θ-carrageenan. Examples of tri-sulphated carrageenans are λ-carrageenan and ν-carrageenan.

Multi-sulphated carrageenans are carrageenans containing at least 2 sulphate groups, preferably 2 or 3 sulphate groups per disaccharide unit.

In some embodiments the multi-sulphated carrageenan can be a non-degraded carrageenan.

In some embodiments the multi-sulphated carrageenan can be a hydrolyzed multi sulphated carrageenan preferably by thermal treatment of a non-degraded multi sulphated carrageenan under acidic pH conditions.

Thermal treatment of carrageenan solutions at acidic pH leads to a hydrolysis of the glycosidic bonds ($\alpha$(1-3) and $\beta$(1-4) bonds) connecting the alternating D-galactose residues. Thus, the average molecular weight was shown to decrease with increasing hydrolysis duration (Singh & Jacobsson, 1994). In addition, a good correlation of the measured viscosity and the molecular weight was observed, meaning that with decreasing molecular weight the viscosity decreases (Singh & Jacobsson, 1994). Preferably the pH is between 1.4 and 4 and preferably the temperature is between 20-98° C. for hydrolysis of the glycosidic bonds, more preferably between 55 and 98° C. Due to the uniform backbone structure, the concentration of carrageenan can be quantified by the content of galactose. In addition, the quantification of galactose allows to determine if the glycosidic bond or also the galactose monomer unit are degraded by the hydrolysis conditions.

A possibility to quantify galactose is the quantification of monosaccharides after acid hydrolysis. Hydrolysis of carrageenan is performed with 72% sulphuric acid ($H_2SO_4$) for 30 min at 30° C., followed by further hydrolysis after dilution to 6% sulphuric acid ($H_2OS_4$) for 3 hours at 100° C. The amount of monosaccharides rhamnose, galactosamine, arabinose, glucosamine, galactose, glucose, mannose, xylose, galacturonic acid and glucuronic acid in the hydrolysate is quantitatively analyzed by High Performance Anion Exchange Chromatography with Pulsed Amperometric Detection (HPAEC-PAD) on a gold electrode. The analyses were performed with an ICS-5000 DP pump, AS-AP autosampler, DC column compartment and ED electrochemical detector (Thermo Scientific). The neutral monosaccharides were eluted using a gradient of 18 mM sodium hydroxide and 200 mM sodium hydroxide with 75 mM sodium acetate. Data analysis was done with Chromeleon software version 7.2 (Thermo Scientific). Quantitative analyses were carried out using standard solutions of the monosaccharides (Sigma-Aldrich).

Analysis of galactose content of the used lambda carrageenan powders shows a galactose content of 50-55 wt. %.

Quantification of the galactose content in the hydrolyzed carrageenan solutions showed comparable galactose contents as related to the initial amounts of used carrageenan powder. These results demonstrate that a hydrolysis of carrageenan at pH ≥1.5 and temperatures ≤95° C. result in the hydrolysis of the glyosidic bonds but do not degrade the galactose unit itself.

In addition, the degree of sulphonation can be quantified by the amount of Sulphur. A possibility to quantify Sulphur is based on the combustion of the sample at temperatures above 1000° C. and reduction of the released Sulphur to Sulphur dioxide (Elementar Vardo Max Cube). The amount of Sulphur is quantified by an IR detector which is calibrated using a calibration curve of sulfadiazine.

The viscosity of the carrageenan solutions was characterized by viscometry: Viscosity measurements were taken with an Anton Paar Rheometer MCR 302 (Switzerland). Flow curves were measured with a shear rate (1/s) range from 1 to 300 at 20° C. To compare different carrageenan solutions, the viscosity at a shear rate of 100/s is used.

The preferred multi-sulphated carrageenans of the invention are ι-carrageenan, δ-carrageenan, μ-carrageenan, θ-carrageenan, λ-carrageenan and ν-carrageenan, the hydrolyzed products of ι-carrageenan, δ-carrageenan, μ-carrageenan, θ-carrageenan, λ-carrageenan and ν-carrageenan; more preferred are ι-carrageenan and λ-carrageenan, and its hydrolyzed products and most preferred is λ-carrageenan and hydrolyzed λ-carrageenan.

Mixtures of multi-sulphated carrageenans can also be used.

The multi-sulphated carrageenans to be used in the present invention have preferably a viscosity between 1 and 3000 mPas, when dissolved as a 4 wt % solution in water at a pH of 5.5.

The dissolved multi-sulphated carrageenans of the invention stabilize the color of the phycocyanin across the full pH range and stabilize the color over time (weeks, for example 6 weeks or more at 32° C.), while mono-sulphated carrageenans work in a limited pH range and do not have the effect of color stabilization over time.

The multi-sulphated carrageenan content of the liquid foodstuff is between 0.005-0.6 wt. %, preferably between 0.01-0.5 wt. %, more preferably between 0.02-0.3 wt. %, most preferably 0.03-0.2 wt %.

The dissolved multi-sulphated carrageenans and phycocyanin from a spirulina-extract are preferably present within the liquid foodstuff at a weight ratio between 1.5:1-200:1, preferably between 2:1-100:1, more preferably between 3:1-50:1, most preferably between 4:1-25:1.

Color

It is known that the phycocyanin configuration impacts color hue. As pH decreases and the equilibrium of phycocyanin is shifted to monomers, the color hue shifts from dark blue to blue green (Buchweitz, 2016). In general, at pH values of 3.9 and less the equilibrium of phycocyanin is shifted to monomers.

The color performance is assessed using hue measurements and the total sum of blue absorbance.

The color hue is measured using a spectrophotometer and a CIE L*a*b value is calculated. Colorimeter measurements provide a numerical representation of color based upon Opponent Color Theory where CIE L*a*b* represents (CIELAB color space):

L* scale: Light vs. Dark where a low number (0-50) indicates Dark and a high number (51-100) indicates Light.

a* scale: Red vs Green where a positive number indicates Red and a negative number indicates Green.

b* scale: Yellow vs. Blue where a positive number indicates Yellow and a negative number indicates Blue.

$$\Delta E = \sqrt{(L^*_1 - L^*_0)^2 + (a^*_1 - a^*_0)^2 + (b^*_1 - b^*_0)^2}$$

ΔE is the overall measure of color difference.

In acidic conditions, it is hypothesized that negatively charged multi-sulphated carrageenans, like for example lambda and iota carrageenan, form complexes with positively charged phycocyanins and prevents it from aggregating and stabilizes the color. A clear shift in color hue is observed with the addition of multi-sulphated carrageenan, like for example, iota and lambda carrageenan in acidic conditions. Table 1 shows the difference in color hue measured by spectrophotometer and represented as CIE L*a*b* at various pHs with and without lambda carrageenan at 0.05 wt. % and constant spirulina extract EXBERRY® Shade Blue Powder 60000002 at 0.5 wt. % (0.012% phycocyanin).

At pH 6.5, there is no change in color hue when lambda carrageenan is added. The ΔE between control and variant at pH 6.5 is 1.0 which indicates no difference in color hue. Between pH 2.6-4.0, the ΔE value is greater than 10 which indicates a significant shift in color. The addition of carrageenan shifts the color hue to be lighter (higher L*) and less blue/more yellow (higher b*).

TABLE 1

Measured CIE L*a*b* values for a beverage with phycocyanin containing spirulina extract at various pH with and without the addition of 0.05% Lambda Carrageenan

| | CONTROL | | | VARIANT (0.05 wt % Lambda Carrageenan) | | | |
|---|---|---|---|---|---|---|---|
| | L* | a* | b | L* | a* | b* | ΔE |
| pH 6.5 | 77.12 | −19.03 | −32.24 | 76.44 | −18.24 | −32.36 | 1.0 |
| pH 4.0 | 66.68 | −23.33 | −18.36 | 85.69 | −17.81 | −15.01 | 20.1 |
| pH 3.5 | 70.16 | −19.45 | −21.44 | 88.92 | −16.48 | −9.66 | 22.4 |
| pH 2.9 | 80.13 | −19.39 | −20.04 | 89.65 | −16.21 | −7.47 | 16.1 |
| pH 2.6 | 83.6 | −19.14 | −15.66 | 89.64 | −14.77 | −4.15 | 13.7 |

The standard method for the phycocyanin determination was established by Yoshikawa & Belay (2008) to calculate the native phycocyanin content (mg/mL) from photometric measurements. It relies upon absorbance measurements at 620 and 650 nm and the extinction coefficients of C-phycocyanin and allophycocyanin at these wavelengths at pH 6.0.

The addition of multi-sulphated carrageenan changes the shape of phycocyanin peak and in some cases, the peak maximum shifts from 620 nm to between 660-670 nm (see FIG. 1). Calculating phycocyanin content using only absorbance measurements at 620 and 650 nm would underestimate phycocyanin content for solutions containing multi-sulphated carrageenan. Thus, to determine the magnitude of color retention, the sum of the blue absorbance measurements at 620 nm-750 nm, 650 nm-750 nm and 667 nm-750 nm are calculated and used.

$$\text{Total sum of blue absorbance} = (A_{620\,nm} - A_{750\,nm}) + (A_{650\,nm} - A_{750\,nm}) + (A_{667\,nm} - A_{750\,nm})$$

To determine the amount of phycocyanin added to a liquid foodstuff, the dosage level of phycocyanin containing spirulina-extract is multiplied by the total phycocyanin content in the phycocyanin containing spirulina-extract.

The phycocyanin content in a spirulina-extract is determined by the calculations published by Yoshikawa & Belay (2008) at pH 6.0 as listed below.

$$\text{allophycocyanin}\left(\frac{mg}{mL}\right) = 0.180(Abs650\,nm - Abs750\,nm) - 0.042(Abs620\,nm - Abs750\,nm)$$

$$C\,\text{phycocyanin}\left(\frac{mg}{mL}\right) = 0.162(Abs620\,nm - Abs750\,nm) - 0.098(Abs650\,nm - Abs750\,nm)$$

$$\text{Total Phycocyanin}\left(\frac{mg}{mL}\right) = \text{allophycocyanin}\left(\frac{mg}{mL}\right) + C\,\text{phycocyanin}\left(\frac{mg}{mL}\right)$$

The phycocyanin content of the liquid foodstuff is preferably between 0.003-0.15 wt. %, preferably 0.006-0.10 wt. %, and most preferably 0.008-0.05 wt. %

The challenge with phycocyanin containing spirulina-extracts is the application to acidified aqueous systems. Phycobiliproteins precipitate out of solution when the pH is between 2.7-6.0. Precipitation may occur immediately or after a few weeks and this is dependent upon factors such as the viscosity, ionic strength, order of addition, and pH of the solution. Precipitation can be delayed when the solution is in a gel or semi-solid form. Aggregation/precipitation is assessed visually. High absorbance at 750 nm after acidification and/or processing indicates a strong potential for protein aggregation.

Other Components

The liquid foodstuff may further contain other components like for example sweeteners, stabilizers, chelating agents, acids, proteins, salts, flavors, vitamins, minerals, pigments, and preservatives.

The acidic liquid foodstuff may have a blue color due to the phycocyanin content, but other colors based on blue may be obtained by way of mixing other pigments in with the liquid foodstuff. The liquid foodstuff may contain other pigments, such as safflomin (safflower), anthocyanin, carotenoid, betanin, annatto, lycopene, curcumin and chlorophyll. The pigments may be added to the blue colored phycocyanin containing liquid foodstuff to blend into other colors, such as for example green using safflomin.

Examples of sweeteners are invert sugar, sucrose, high fructose corn syrup, corn syrup, fructose, glucose, trehalose, lactose, honey, agave, stevia, sucralose, aspartame, neotame, acesulfame potassium, monk fruit, or saccharine.

Examples of preservatives are salts, sorbic add, benzoic acid, natamycin, nisin and sulfites.

Examples of salts are ionic compounds that can be formed with the positively charged cation such as calcium, magnesium, potassium, sodium, or copper with salt forming anions like for example acetate, carbonate, chloride, citrate, oxide, phosphate, sorbate, benzoate, hexametaphosphate or sulfate.

Examples of acids are phosphoric, citric, lactic, malic, adipic, tartaric acid or sodium add pyrophosphate.

The liquid foodstuff may contain chelators, which may also be referred to as chelating agents.

Chelators are binding agents that influence the chemical and/or physical state of the molecules/atoms they bind by forming chelates. Chelators can improve color retention and have been found to work synergistically with the multi-sulphated carrageenans.

Chelating agents can be synthetic and natural compounds and include the group of ethylene diamine tetra acetic acid and/or its Na, K, Ca salts (EDTA), L-glutamic acid N,N-diacetic acid tetrasodium salt (GLDA), sodium hexametaphosphate, glutathione, metallothionein, 2,3-dimercapto-1-propanesulfonic acid, chlorella, garlic, cilantro, selenium, milk thistle, vitamin C, vitamin E, citrates, grape seed extract, quercetin, and lipoic acid.

The chelating agents are preferably selected from the group of ethylene diamine tetra acetic add and/or its Na, K, Ca salts (EDTA) and L-glutamic add N,N-diacetic acid tetrasodium salt (GLDA). EDTA is considered to be ethylene diamine tetra acetic acid together with its Na, K, Ca salts, like for example calcium disodium ethylenediaminetetraacetate, disodium ethylenediaminetetraacetate, tetrasodium ethylenediaminetetraacetate, dipotassium ethylenediaminetetraacetate, and tripotassium ethylenediaminetetraacetate.

Calcium disodium ethylenediaminetetraacetate is abbreviated to $CaNa_2$ EDTA, disodium ethylenediaminetetraacetate is abbreviated to $Na_2$ EDTA, tetrasodium ethylenediaminetetraacetate is abbreviated to $Na_4$ EDTA, dipotassium ethylenediaminetetraacetate is abbreviated to $K_2$ EDTA, and tripotassium ethylenediaminetetraacetate is abbreviated to $K_3$ EDTA.

The chelating agent is preferably present between 1-2000 ppm in the liquid foodstuff.

1 ppm of chelating agent is to be understood as 0.0001 wt %; for example, 30 ppm of EDTA are 0.003 wt. %.

EDTA is preferably present between 10-300 ppm, preferably 15-200 ppm, most preferably 20-100 ppm.

The EDTA and phycocyanin from a spirulina-extract are preferably present within the liquid foodstuff at a weight ratio between 4:1-1:200, preferably between 2:1-1:125, most preferably 1:1-1:75.

The multi-sulphated carrageenans in combination with a chelator such as EDTA showed a surprisingly high increase in color retention and extended shelf life after thermal treatment and/or use of preservatives. The effect of EDTA is the most pronounced in the presence of preservatives, alcohol and/or after thermal processing below a pH 2.7 or above a pH of 3.2.

In a preferred embodiment the liquid foodstuff is a beverage comprising between 0.005-0.6 wt. % of λ-carrageenan and/or i-carrageenan, between 0.003-0.15 wt % of phycocyanin from a spirulina-extract, wherein the beverage has a pH between 2.0-4.6 and wherein the weight ratio of λ-carrageenan and/or i-carrageenan to phycocyanin is between 1.5:1-200:1. Preferably the pH is between 2.4 and 3.3.

In another embodiment the liquid foodstuff is a beverage comprising between 0.005-0.6 wt. % of λ-carrageenan and/or i-carrageenan, between 0.003-0.13 wt. % of phycocyanin from a spirulina-extract and optionally a chelating agent, wherein the weight ratio of λ-carrageenan and/or i-carrageenan to phycocyanin from a spirulina-extract is between 1.5:1-200:1 and wherein the pH is between 2.0 and 4.6. Preferably the chelating is EDTA. More preferably the chelating agent EDTA is present in an amount between 10 and 300 ppm. Preferably the pH is between 2.3 and 3.6.

In another embodiment the liquid foodstuff is a beverage comprising between 0.01-0.5 wt. % of λ-carrageenan and/or i-carrageenan, phycocyanin from a spirulina-extract and optionally a chelating agent, wherein the pH is between 2.0-4.6 and wherein the weight ratio of λ-carrageenan and/or i-carrageenan to phycocyanin from a spirulina-extract is between 2:1-100:1. Preferably the chelating agent is EDTA present in an amount from 15-200 ppm. Preferably the pH is between 2.2 and 4.0.

In another embodiment the liquid foodstuff is a beverage comprising between 0.01-0.5 wt. % of λ-carrageenan, between 0.006-0.1 wt. % of phycocyanin from a spirulina-extract and 10-300 ppm of chelating agent, wherein the weight ratio of λ-carrageenan to phycocyanin is between 2:1-100:1, and wherein the pH is between 2.2-4.0.

Process

Liquid foodstuffs are typically transported and stored before being consumed. To assure that these liquid foodstuffs do not spoil and are safe for consumption, either thermal processes, preservatives, or combination of both are used.

A considerable blue color loss is observed upon high temperature short time (120° C. for 6 seconds) processing and when preservatives are used for solutions without carrageenans.

The multi-sulphated carrageenans in combination with a chelator such as EDTA showed a surprisingly high increase in color retention and extended shelf life after thermal treatment, especially at pH values above 3.2, and/or use of preservatives.

The liquid foodstuff according to the invention can be obtained according to a process comprising the following steps:
 a) Adding the multi-sulphated carrageenans in water and mixing until the multi-sulphated carrageenans are dissolved, as determined by visual observation at a pH of at least 5, preferably between 5 and 10;

b) Adding the phycocyanin containing spirulina-extract, and mixing until dissolved;
c) Adding an acid or acidifying component;
d) Optionally adding a sweetener, flavor, vitamin, mineral, salt, buffer, juice, or other beverage components;
e) Optionally adding a chelating agent, such as EDTA;
f) Optionally adding other pigments, such as anthocyanins;
g) Optionally adding an additive, such as preservatives;
h) Adding solvents to obtain the total volume, such as water and alcohol;
i) Treating the mixture of a)-h) by either thermally processing the liquid to at least 65° C. and filling it into a container; or no thermal treatment and cold filling into a container, or combinations of the two.

It is important that step a) and b) of the process are carried out at a pH of at least 5 and before any component is added that will destabilize phycocyanin before it is dissolved with the multi-sulphated carrageenan. List of compounds that may destabilize phycocyanin includes but is not limited to acids, anthocyanins, vitamin C, safflower, and alcohol. Acids can be used to prepare a hydrolyzed carrageenan, but the hydrolyzed carrageenan should be neutralized to a pH of at least 5 before mixing with the phycocyanin.

Components that do not decrease the pH or destabilize phycocyanin, can be added during or before step a) of the process. Multi-sulphated carrageenan can for example be dry blended with a non-acidic carbohydrate such as sucrose or maltodextrin to improve dissolution.

Step c) (adding of the acid or acidifying component) can be done before or after steps d), e), or f).

Step h) is preferably performed after steps a)-g).

If present, preservatives (step g) preferably are added before or during step a) due to solubility limitations of preservatives.

Multi-sulphated carrageenans are linear polysaccharides with repeating sulphated galactose units. The glycosidic linkages between galactose units are subject to hydrolysis with heat and acid. Hydrolyzed multi-sulphated carrageenan is found to also stabilize phycocyanin, however, hydrolyzed multi-sulphated carrageenan must be neutralized to a pH of at least 5 prior to complexing with phycocyanin. Both hydrolyzed and non-degraded multi-sulphated carrageenan should have a pH of at least 5 prior to the addition of phycocyanin to prevent precipitation. Preferably the pH of the solution containing multi-sulphated carrageenan is between 5 and 10, more preferably between 5.5 and 9.9.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

REFERENCES

Buchweitz, M. (2016). 17-Natural Solutions for Blue Colors in Food. In R. Care, & R. M. Schweiggert (Eds.), *Handbook on Natural Pigments in Food and Beverages* (pp. 355-384): Woodhead Publishing.

Dewi, E. N. et al. 2017, "Physical characteristics of phycocyanin from Spirulina microcapsules using different coating materials with freeze drying method", *IOP Conf. Ser.: Earth Environ. Sci.* 55.

Selig, M. J., et al., (2017), "Protection of blue color in a spirulina derived phycocyanin extract from proteolytic and thermal degradation via complexation with beet-pectin", *Food Hydrocolloids*.

Singh, Satish K. and Jacobsson, Sven P. (1996). Kinetics of acid hydrolysis of κ-carrageenan as determined by molecular weight (SEC-MALLSRI), gel breaking strength, and viscosity measurements. *Carbohydrate Polymers*, 23, 89-103. Yoshikawa & Belay (2008) Yoshikawa, N., & Belay, A. (2008). Single-Laboratory Validation of a Method for the Determination of c-Phycocyanin and Allophycocyanin in Spirulina (Arthrospira) Supplements and Raw Materials by Spectrophotometry. *Journal of AOAC International*, 91, 524-529.

EXAMPLES

Experiment 1
Experiment 1.1

Various hydrocolloids were investigated to determine which ones prevented phycocyanin precipitation/aggregation and mitigated color loss. Seven hydrocolloids were tested at a dosage level of 0.05 wt. % in a 7 wt. % sucrose solution at pH 3.3 and EXBERRY® Shade Blue Powder 60000002 phycocyanin containing spirulina-extract at 0.5 wt % (equating to 0.012 wt % phycocyanin). The beverage solution was thermally processed to 85° C. and filled hot into PET bottles and cooled in a water bath to less than 35° C.

Figure 2:
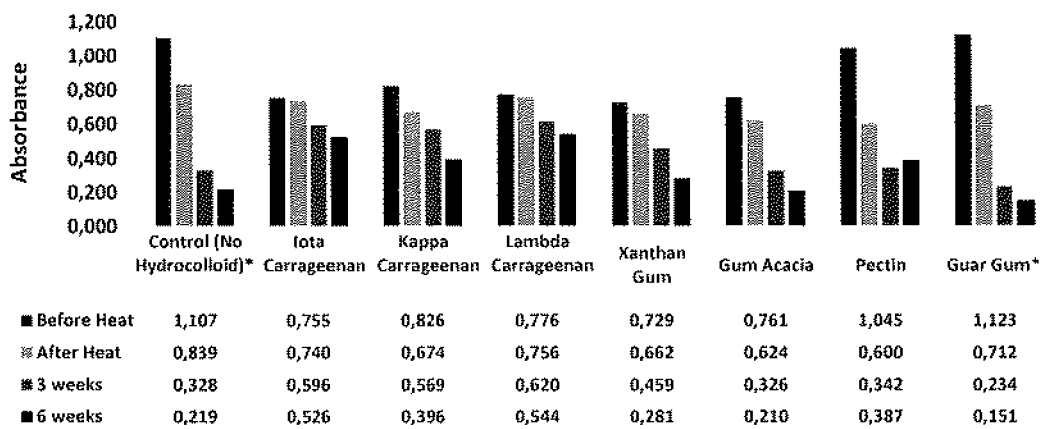
FIG. 2: Samples at pH 3.3 placed in accelerated conditions (32° C. hotbox) for 6 weeks and measured at week 0, 3 and 6. The measurement is the total sum of blue absorbance. Lambda equals λ-carrageenan, iota equals ι-carrageenan and kappa equals κ-carrageenan.

From the experiment, the control sample (no hydrocolloid) and the sample with guar gum had significant precipitation after thermal processing. The remaining solutions containing ι-carrageenan, κ-carrageenan, λ-carrageenan, xanthan gum, high methoxyl pectin (citrus/apple) and gum acacia prevented precipitation, however, color retention varied between the different hydrocolloids. Pectin, xanthan gum, gum acacia and guar gum accelerated color loss in acidic conditions. The samples were placed into 32° C. hotbox for 6 weeks and analyzed at week 0, 3 and 6. Multi-sulphated carrageenans had a surprisingly long-lasting impact on color preservation (see FIG. 2 and table 2).

TABLE 2

Total Sum of Blue Absorbance after thermal processing and 6 weeks in 32° C. hot box

| | Total Sum of Blue Absorbance 6 weeks @ 32 C |
|---|---|
| Control (No Hydrocolloid)* | 0.219 |
| Iota Carrageenan | 0.526 |
| Kappa Carrageenan | 0.396 |

TABLE 2-continued

Total Sum of Blue Absorbance after thermal processing and 6 weeks in 32° C. hot box

|  | Total Sum of Blue Absorbance 6 weeks @ 32 C |
|---|---|
| Lambda Carrageenan | 0.544 |
| Xanthan Gum | 0.281 |
| Gum Acacia | 0.210 |
| High Methoxyl Pectin (Citrus & Apple) | 0.387 |
| Guar Gum* | 0.151 |

*Precipitated

Experiment 1.2

Additional hydrocolloids were evaluated to determine if color stabilization is specific to di- and tri-sulphated carrageenan. Cellulose gum, locust bean gum, propylene glycol alginate, sodium alginate, Low Methoxyl (LM) Pectin (citrus/apple), High Methoxyl (HM) Pectin (sugar beet), Amidated Pectin (citrus/apple) were tested at a dosage level of 0.058 wt. % in a 7 wt. % sucrose solution at pH 3.3 and EXBERRY® Shade Blue Powder 60000002 phycocyanin containing spirulina-extract at 0.5 wt. % (equating to 0.012 wt. % phycocyanin). The beverage solutions were thermally processed to 85° C. and filled hot into PET bottles and cooled in a water bath to less than 35° C.

From the experiment, the cellulose gum, locust bean gum, and amidated pectin variants had significant precipitation after thermal processing. Beverages containing propylene glycol alginate, sodium alginate, LM pectin (citrus/apple), and HM pectin (sugar beet) did not have precipitate post processing, however, color retention was poor after 6 weeks in 32° C. hotbox. Lambda carrageenan beverages performed significantly better than cellulose gum, locust bean gum, propylene glycol, sodium alginate, three different pectin types (table 3).

TABLE 3

Total Sum of Blue Absorbance after thermal processing and 6 weeks in 32 C hot box

|  | Total Sum Blue Absorbance (6 weeks @ 32 C) |
|---|---|
| Lambda Carrageenan | 0.49 |
| Cellulose Gum* | 0.02 |
| Locust Bean Gum* | 0.18 |
| Propylene Glycol Alginate | 0.29 |
| Sodium Alginate | 0.20 |
| LM Pectin (citrus/apple) | 0.37 |

TABLE 3-continued

Total Sum of Blue Absorbance after thermal processing and 6 weeks in 32 C hot box

|  | Total Sum Blue Absorbance (6 weeks @ 32 C) |
|---|---|
| HM Pectin (sugar beet) | 0.27 |
| Amid Pectin (citrus/apple)* | 0.02 |

*Precipitated

Experiment 1.3

The same hydrocolloids as in experiment 1.1 were evaluated at pH 2.9 and 4.0 to determine which hydrocolloids have the largest impact on color retention at the various pHs. Seven hydrocolloids were tested at a dosage level of 0.05 wt. % in a 7 wt % sucrose solution at pH 2.9 and 4.0 with EXBERRY® Shade Blue Powder 60000002 phycocyanin containing spirulina-extract at 0.5 wt % (equating to 0.012 wt % phycocyanin). The beverage solutions at pH 2.9 and 4.0 were thermally processed to 85° C. (microwave) and filled hot into PET bottles and cooled in a water bath to less than 35° C.

Spirulina aggregation occurred in all samples, except for the λ-carrageenan, ι-carrageenan and HM pectin (citrus, apple) (see table 4). Though pectin did not lead to precipitation of spirulina, it does not stabilize spirulina color in acidic conditions (see tables 2-4 and FIG. 2).

TABLE 4

Aggregation behavior of spirulina proteins post thermal processing

| pH | Control | LC | i-C | κ-C | HM Pectin (citrus/apple) | Xanthan | Gum Acacia | Guar Gum |
|---|---|---|---|---|---|---|---|---|
| 2.9 | No | No | No | Yes | No | Yes | Yes | Yes |
| 4.0 | Yes | No | No | Yes | No | No | No | Yes |

LC: lambda carrageenan,
i-C: iota carrageenan,
κ-C: kappa carrageenan

Experiment 2
Experiment 2.1

Dosage levels of 0.02-0.20 wt. % of Ticaloid® 750 (TIC GUMS) λ-carrageenan in a pH 2.8 beverage with EXBERRY® Shade blue powder 60000002 phycocyanin containing spirulina-extract at 0.4 wt % (equating to 0.0093 wt % phycocyanin) was set up, thermally processed to 85° C. (microwave) and filled hot into PET bottles. The 6 weeks aged (at 32° C.) hot filled beverages at pH 2.8 were measured for their absorbance with no λ-carrageenan and four different levels of λ-carrageenan. The percent improvement was determined using the total sum of blue absorbance and modified total phycocyanin calculations measured at pH 2.8 instead of pH 6.0 as referred in Yoshikawa & Belay (2008) (see table 5).

TABLE 5

Color improvement as compared to control hot fill beverage at pH 2.8 and λ-carrageenan variants at 0.02-0.20 wt. % after 6 weeks storage at 32 C.

| Sample | Ratio LC:PC | $A_{620\,nm}-A_{750\,nm}$ | $A_{650\,nm}-A_{750\,nm}$ | $A_{667\,nm}-A_{750\,nm}$ | Total Sum of Blue Abs | % improve vs. Control | allo-PC (mg/mL) | C-PC (mg/mL) | Total PC (mg/mL) | % improve vs. Control |
|---|---|---|---|---|---|---|---|---|---|---|
| Control | 0.0 | 0.121 | 0.064 | 0.047 | 0.185 | NA | 0.006 | 0.013 | 0.020 | NA |
| 0.02% LC | 2.15 | 0.144 | 0.147 | 0.147 | 0.292 | 57% | 0.020 | 0.009 | 0.029 | 49% |
| 0.05% LC | 5.37 | 0.148 | 0.152 | 0.152 | 0.301 | 62% | 0.021 | 0.009 | 0.030 | 53% |

TABLE 5-continued

Color improvement as compared to control hot fill beverage at pH 2.8 and λ-carrageenan variants at 0.02-0.20 wt. % after 6 weeks storage at 32 C.

| Sample | Ratio LC:PC | $A_{620\ nm}$-$A_{750\ nm}$ | $A_{650\ nm}$-$A_{750\ nm}$ | $A_{667\ nm}$-$A_{750\ nm}$ | Total Sum of Blue Abs | % improve vs. Control | allo–PC (mg/mL) | C–PC (mg/mL) | Total PC (mg/mL) | % improve vs. Control |
|---|---|---|---|---|---|---|---|---|---|---|
| 0.10% LC | 10.75 | 0.139 | 0.143 | 0.142 | 0.282 | 52% | 0.020 | 0.009 | 0.028 | 44% |
| 0.20% LC | 21.5 | 0.140 | 0.143 | 0.143 | 0.283 | 53% | 0.020 | 0.009 | 0.029 | 44% | allo-PC: allophyoocyanin,
C-PC: C-phycocyanin,
PC: phycocyanin,
LC - λ-carrageenan Experiment 2.2

Preservatives are typically added to cold filled beverages to control for yeast, mold, and bacteria. An experiment was conducted to determine if λ-carrageenan and/or EDTA can stabilize spirulina color across a wide pH range when cold filling with potassium sorbate at 1000 ppm. A range of variants were tested at pH 2.9, 3.5 and 4.0 all containing EXBERRY® Shade Blue Powder 60000002 phycocyanin containing spirulina-extract at 0.5 wt. % (equating to 0.012 wt. % phycocyanin) and sucrose at 7 wt. % with combinations of EDTA (disodium ethylenediaminetetraacetate) at 30 ppm and/or Ticaloid® 750 λ-carrageenan at 0.05 wt %. The samples were stored at 32° C. and the color stability was analyzed after 2, 4, 6, 9 and 12 weeks by determination of the Total Sum of Blue Absorbance (see table 6).

The control and EDTA samples at pH 3.5 and 4.0 had significant precipitate due to protein aggregation. Color measurements were not taken for control and EDTA samples due to the high level of precipitate.

TABLE 6

Total sum of blue absorbance stability data at 32° C. at pH 2.9, 3.5 and 4.0 for cold fill beverage with potassium sorbate

| | Total Sum of Blue Absorbance ((A620-750) + (A650-750) + (A667-750)) | | | | | |
|---|---|---|---|---|---|---|
| | T0 | 2 weeks | 4 weeks | 6 weeks | 9 weeks | 12 weeks |
| Control pH 2.9 | 0.89 | 0.43 | 0.29 | 0.21 | 0.14 | 0.11 |
| λ-Carrageenan 0.05 wt. % pH 2.9 | 0.79 | 0.48 | 0.30 | 0.27 | 0.17 | 0.11 |
| EDTA 30 ppm pH 2.9 | 0.91 | 0.56 | 0.46 | 0.41 | 0.35 | 0.33 |
| λ-Carrageenan + EDTA pH 2.9 | 0.79 | 0.68 | 0.64 | 0.60 | 0.56 | 0.51 |
| Control pH 3.5 | 0.93 | NA | NA | NA | NA | NA |
| λ-Carrageenan 0.05 wt. % pH 3.5 | 0.80 | 0.48 | 0.34 | 0.28 | 0.18 | 0.12 |
| EDTA 30 ppm pH 3.5 | 0.91 | NA | NA | NA | NA | NA |
| λ-Carrageenan 4 + EDTA pH 3.5 | 0.81 | 0.59 | 0.54 | 0.51 | 0.46 | 0.41 |
| Control pH 4.0 | 0.97 | NA | NA | NA | NA | NA |
| λ-Carrageenan 0.05 wt. % pH 4.0 | 0.56 | 0.46 | 0.38 | 0.33 | 0.25 | 0.19 |
| EDTA 30 ppm pH 4.0 | 0.97 | NA | NA | NA | NA | NA |
| λ-Carrageenan + EDTA pH 4.0 | 1.01 | 0.53 | 0.47 | 0.44 | 0.38 | 0.34 |

NA: not analyzed

Experiment 3

Experiment 3.1

To determine critical limits, a series of hot fill beverages were prepared with different phycocyanin containing spirulina-extracts, phycocyanin levels, λ-carrageenan levels and weight ratios of λ-carrageenan (LC) to phycocyanin (PC). All beverages were prepared with 7 wt. % sucrose and 0.1 wt % citric acid and prepared with the same order of addition and thermally processed to 85° C. (microwave) and filled into PET bottles. The phycocyanin levels in the beverage ranged from 0.012-0.031 wt. %, λ-carrageenan levels ranged from 0.005-0.527 wt. %, and the weight ratio of LC:PC ranged from 0.43-17.00 (see Table 7).

When the weight ratio of LC:PC was 0.86 or less, segregation occurred. Spirulina proteins (including phycocyanin) precipitated out of solution either immediately or after 2 weeks of storage. No segregation occurred at the high end of the weight ratios, however, high weight ratios require a high level of λ-carrageenan and viscosity of the solution starts to become a self-limiting factor for a beverage application.

TABLE 7

Segregation of hot fill beverages with varying levels of phycocyanin (PC), λ-carrageenan (LC), and weight ratio of LC:PC

| EXBERRY® Shade Blue | % Phycocyanin (PC) Content in EXBERRY® Shade Blue | % Spirulina in Beverage | % Phycocyanin (PC) in Beverage | % λ-Carrageenan (LC) in Beverage | Ratio LC:PC | Segregation (Separation or Precipitation) |
|---|---|---|---|---|---|---|
| 60000002 | 2.33 | 0.500 | 0.012 | 0.005 | 0.43 | Yes |
| 60000002 | 2.33 | 0.500 | 0.012 | 0.010 | 0.86 | Yes |
| 60000002 | 2.33 | 0.500 | 0.012 | 0.020 | 1.72 | No |
| 60000002 | 2.33 | 0.500 | 0.012 | 0.050 | 4.30 | No |
| 60000204 | 21.70 | 0.054 | 0.012 | 0.050 | 4.27 | No |

TABLE 7-continued

Segregation of hot fill beverages with varying levels of phycocyanin
(PC), λ-carrageenan (LC), and weight ratio of LC:PC

| EXBERRY® Shade Blue | % Phycocyanin (PC) Content in EXBERRY® Shade Blue | % Spirulina in Beverage | % Phycocyanin (PC) in Beverage | % λ-Carrageenan (LC) in Beverage | Ratio LC:PC | Segregation (Separation or Precipitation) |
|---|---|---|---|---|---|---|
| 60000002 | 2.33 | 0.500 | 0.012 | 0.100 | 8.60 | No |
| 60000002 | 2.33 | 0.500 | 0.012 | 0.200 | 17.20 | No |
| 60000002 | 2.33 | 0.667 | 0.016 | 0.067 | 4.30 | No |
| 60000202 | 3.10 | 0.500 | 0.016 | 0.067 | 4.30 | No |
| 60009205 | 27.90 | 0.056 | 0.016 | 0.067 | 4.30 | No |
| 60000002 | 2.33 | 1.000 | 0.023 | 0.100 | 4.30 | No |
| 60000002 | 2.33 | 1.333 | 0.031 | 0.020 | 0.65 | Yes |
| 60000002 | 2.33 | 1.333 | 0.031 | 0.133 | 4.29 | No |
| 60000002 | 2.33 | 1.333 | 0.031 | 0.527 | 17.00 | No |

Experiment 3.2

An experiment was conducted with EXBERRY® Shade Blue Powder 60000002 at 0.5 wt. % with 0.1 wt. % citric acid and 7 wt. % sucrose at three different alcohol levels. EDTA (disodium ethylenediaminetetraacetate) at 30 ppm and/or Ticaloid® 750 lambda carrageenan at 0.05 wt. % was added to determine if phycocyanin containing spirulina concentrate can be stabilized in high acid alcohol containing beverages.

Alcohol levels tested were 5, 15, and 40 wt. %. The 5 wt. % alcohol solutions had a pH of 2.9, the 15 wt. % alcohol solution had a pH of 3.0, and the 40 wt. % alcohol had a pH of 3.6. Alcohol levels of 5 and 15 wt. % represent hard ciders, malt liquors, wine, and other alcoholic drinks. The 40 wt % formulation represents alcohol content in spirits such as vodka.

All formulas were cold filled with no preservatives added with the following order of addition:

1) Dry blend lambda carrageenan with sugar. Add to 50 wt. % of the total water. Mix until fully hydrated.
2) Add spirulina concentrate and mix until fully dissolved.
3) Add citric acid and mix until fully dissolved.
4) Add EDTA (if used).
5) Add remaining water and alcohol.

The alcohol containing beverages were analyzed by photometer within 2 hours after batching (T0) and after three weeks of accelerated storage at 32° C. (T3).

Photometric measurements at T0 and T3 weeks are in table 8. The results show that as alcohol level increases, the color becomes less stable. At 40 wt. % alcohol, significant color loss and precipitation occurred in the control and EDTA only samples. No precipitation occurred in the control samples at 5 and 15 wt % alcohol levels, however, significant color loss occurred, 70 and 81% respectively. Lambda carrageenan stabilizes phycocyanin containing spirulina-extract from precipitating in the presence of alcohol up to 40 wt % and when used in combination with EDTA the blue color is retained.

TABLE 8

Color stability of phycocyanin containing spirulina-extract in acidified alcoholic solutions after 3 weeks at 32° C.

| | T0 | T3 wks | % Loss |
|---|---|---|---|
| Color stability in 5% Alcohol Beverage (Total Sum of Blue Absorbance) (7 wt. % Sucrose, 0.1 wt. % Citric Acid, 0.5 wt. % EXBERRY ® Shade Blue Powder 60000002) | | | |
| 5% ETOH Control | 0.799 | 0.237 | 70% |
| 5% ETOH 0.05% Lambda | 0.781 | 0.551 | 29% |
| 5% ETOH 30 ppm EDTA | 0.816 | 0.413 | 49% |
| 5% ETOH Lambda + EDTA | 0.779 | 0.638 | 18% |
| Color stability in 15% Alcohol Beverage (Total Sum of Blue Absorbance) | | | |
| 15% ETOH Control | 0.654 | 0.126 | 81% |
| 15% ETOH 0.05% Lambda | 0.759 | 0.330 | 57% |
| 15% ETOH 30 ppm EDTA | 0.729 | 0.415 | 43% |
| 15% ETOH Lambda + EDTA | 0.758 | 0.589 | 22% |
| Color stability in 40% Alcohol Beverage (Total Sum of Blue Absorbance) | | | |
| 40% ETOH Control | 0.643 | 0.079 | 88% |
| 40% ETOH 0.05% Lambda | 0.762 | 0.246 | 68% |
| 40% ETOH 30 ppm EDTA | 0.581 | 0.322 | 46% |
| 40% ETOH Lambda + EDTA | 0.758 | 0.505 | 33% |

Experiment 4

Figure 3:
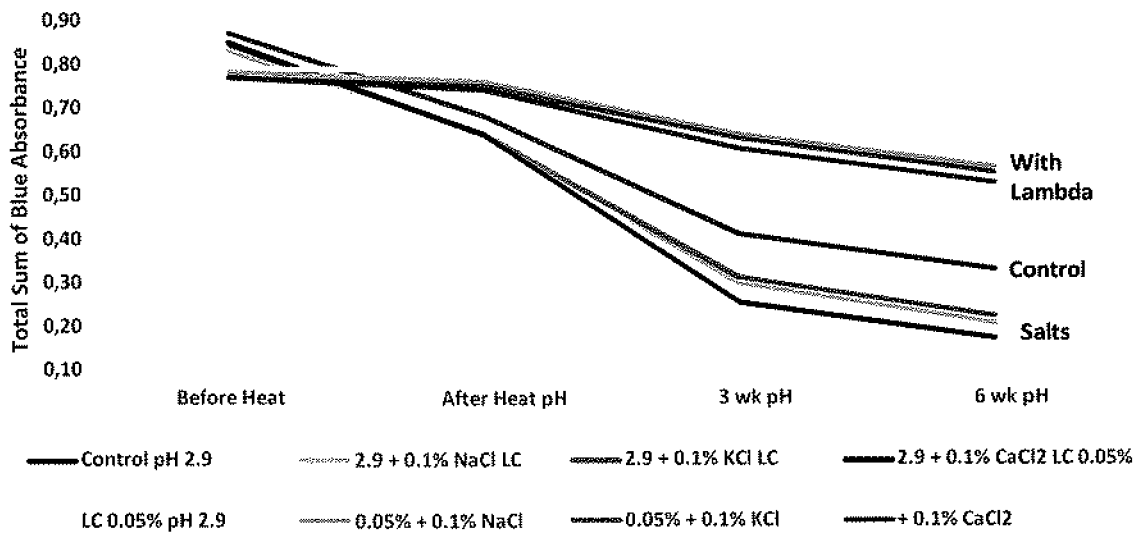
FIG. 3: Hot fill beverage samples at pH 2.9 placed in accelerated conditions (32° C. hotbox) for 6 weeks and measured at week 0, 3 and 6. The measurement is the total sum of blue absorbance. Compares the impact of NaCl, KCl, and $CaCl_2$ salts at 0.1 wt. % on blue color stability of phycocyanin containing spirulina extract with and without addition of 0.05 wt. % λ-carrageenan.

High conductivity has been found to have a negative impact on spirulina stability. An experiment was conducted with NaCl, KCl, and $CaCl_2$ at 0.1 wt. % all with EXBERRY® Shade Blue Powder 60000002 at 0.5 wt. % and sucrose at 7 w/w. % at pH 2.9 and Ticaloid® 750 λ-carrageenan at 0.05 wt. %. The conductivity of the beverages with salt ranged from 2200-2450 μs/cm. The results show that the addition of salts to a beverage colored with a phycocyanin containing spirulina-extract without the presence of λ-carrageenan is detrimental to color stability. After 6 weeks of storage in a 32° C. hotbox, beverages with 0.10% NaCl, KCl, or $CaCl_2$ shifted from blue to green and had 33-48% less blue color than the control beverage, as measured by total sum of blue absorbance. With the addition of 0.05 wt % λ-carrageenan, the negative impact of NaCl, KCl, or $CaCl_2$ is mitigated. Color loss after 6 weeks at 32° C., between beverages with λ-carrageenan and λ-carrageenan plus 0.10% NaCl, KCl, or CaCl$_2$ is minimal. The difference is less than 10% as measured by total sum of blue absorbance. All beverages with λ-carrageenan with and without salts were blue and had significantly better color retention than control with and without salts. Table 9 and FIG. 3 show the negative impact of salt content to phycocyanin color stability and the stabilizing effect of λ-carrageenan. A small amount of precipitate was noticed in the CaCl$_2$ variants with λ-carrageenan which may indicate some gel formation between calcium and λ-carrageenan.

TABLE 9

Impact of salt on color stability of phycocyanin containing spirulina extract in hot fill pH 2.9 beverage (Total Sum of Blue Absorbance) 7 wt. % Sucrose, pH 2.9 with 0.5 wt % EXBERRY ® Shade Blue Powder 60000002

|  | Before Heat | After Heat | 3 weeks @ 32° C. | 6 weeks @ 32° C. | % difference vs. No Salt & Salt |
|---|---|---|---|---|---|
| Control pH 2.9 | 0.87 | 0.68 | 0.41 | 0.33 |  |
| pH 2.9 + 0.1% NaCl | 0.83 | 0.64 | 0.30 | 0.20 | −38% |
| pH 2.9 + 0.1% KCl | 0.84 | 0.64 | 0.31 | 0.22 | −33% |
| pH 2.9 + 0.1% CaCl2 | 0.85 | 0.64 | 0.25 | 0.17 | −48% |
| LC 0.05% pH 2.9 | 0.79 | 0.79 | 0.66 | 0.58 |  |
| LC 0.05% + 0.1% NaCl | 0.78 | 0.76 | 0.64 | 0.56 | −3% |
| LC 0.05% + 0.1% KCl | 0.77 | 0.75 | 0.63 | 0.55 | −5% |
| LC 0.05% + 0.1% CaCl2 | 0.77 | 0.74 | 0.61 | 0.53 | −9% |

LC: λ-carrageenan

Experiment 5

Experiment 5.1

An experiment was conducted with phycocyanin containing spirulina-extract, EXBERRY® Shade Blue Powder 60000002 at 0.5 wt. % and two different levels of safflower concentrate in a hot fill 7 wt % sucrose beverage at pH 2.9. The addition of EDTA (disodium ethylenediaminetetraacetate) at 30 ppm and/or Ticaloid® 750 λ-carrageenan at 0.05 wt. % was varied to determine if a stable green beverage can be achieved. The safflower concentrate used in the study was EXBERRY® Shade Green 54000002 and the two dosage levels were 0.075 wt. % and 0.15 wt. %. The beverages were analyzed by photometer before and after hot fill thermal processing (85° C. by microwave) and at week 3 and 6 In 32° C. hotbox storage. A total of eight samples were tested: control, λ-carrageenan, EDTA, and λ-carrageenan with EDTA at two different safflower levels.

The results of the study show that safflower concentrate at the high dosage level of 0.15 wt % In combination with phycocyanin containing spirulina-extract at 0.5 wt. % caused significant precipitation which was surprising as it is outside the typical pH range of spirulina protein aggregation. This was observed in both the control and EDTA samples at the high safflower dosage level. The addition of λ-carrageenan at 0.05 wt. % prevented precipitation from occurring and stabilized the green color during heating and through accelerated storage. The color of the control and EDTA samples after 6 weeks at 32° C. shifted significantly and were dark brown.

At the lower dosage level of safflower concentrate, 0.075% no precipitation occurred, however, the control and EDTA samples shifted from emerald green to khaki green/brown after 3 weeks at 32° C. The beverages with λ-carrageenan and λ-carrageenan with EDTA remained green after 6 weeks at 32° C. Table shows the CIE L*a*b*of the initial beverage. From the L*a*b* values, it is clear to see that the addition of λ-carrageenan shifts the initial color of the beverage and it is brighter, more red, and less blue than control and EDTA samples. As stated previously, this indicates a potential interaction between λ-carrageenan and phycocyanin.

Table 10 also includes ΔE values after thermal processing and at 3 and 6 weeks at 32° C. The ΔE value for control and EDTA samples are significantly higher than the λ-carrageenan and λ-carrageenan with EDTA samples at both levels of safflower concentrate tested.

Lambda carrageenan is found to protect phycocyanin containing spirulina-extract from protein aggregation in the presence of safflower concentrate and it protects the color during thermal processing and over storage.

TABLE 10

Color stability of phycocyanin containing spirulina-extract in combination with safflower concentrate at two different dosage levels in hot fill beverage

|  | Initial Color Before Thermal Processing | | | Δ E (color change) | | | Color |
|---|---|---|---|---|---|---|---|
|  | L* | a* | b* | post heat | 3 wks | 6 wks | @ 6 weeks |
| 60000002 @ 0.5% + 54000002 @ 0.075% | | | | | | | |
| Control | 77.9 | −44.6 | 27.0 | 16.9 | 28.6 | 31.9 | brown |
| λ-carrageenan 0.05% | 88.2 | −35.5 | 40.6 | 3.0 | 10.7 | 16.8 | green |
| EDTA 30 ppm | 77.8 | −44.3 | 27.2 | 17.2 | 26.5 | 31.0 | brown |
| λ-carrageenan 0.05% + EDTA 30 ppm | 88.4 | −35.4 | 40.6 | 3.0 | 10.2 | 15.6 | green |
| 60000002 @ 0.5% + 54000002 @ 0.15% | | | | | | | |
| Control | 62.6 | −42.9 | 42.2 | 31.1 | 36.6 | 36.8 | precipitate |
| λ-carrageenan 0.05% | 84.3 | −38.0 | 59.1 | 5.2 | 12.8 | 19.0 | green |
| EDTA 30 ppm | 62.8 | −43.2 | 41.9 | 29.3 | 32.2 | 34.1 | precipitate |
| λ-carrageenan 0.05% + EDTA 30 ppm | 84.2 | −38.1 | 59.0 | 5.3 | 10.1 | 15.5 | green |

Experiment 5.2

An experiment was conducted with phycocyanin containing spirulina extract, EXBERRY® Shade Blue Powder 60000002 at 0.5 wt. % in combination with an anthocyanin based color, EXBERRY® Shade Red 15000001 at 0.01% In a hot fill 7 wt. % sucrose beverage at pH 2.9. The addition of EDTA (disodium ethylenediaminetetraacetate) at 30 ppm and/or Ticaloid® 750 λ-carrageenan at 0.05 wt. % was varied to determine if blending spirulina with anthocyanins can be achieved. The beverages were analyzed by photometer before and after hot fill thermal processing (WC by microwave) and at week 3 and 6 after storage in 32° C. hotbox. A total of four samples were tested: control, λ-carrageenan, EDTA, and λ-carrageenan with EDTA.

Table 11 shows the CIE L*a*b* of the initial beverage. From the L*a*b* values, it is clear to see that the addition of λ-carrageenan shifts the initial color of the beverage and it is brighter, more red, and less blue than control and EDTA samples. The color loss in both the control and EDTA samples is significantly higher than the λ-carrageenan and λ-carrageenan with EDTA as determined by ΔE. The higher the ΔE the higher the degree of color change.

With the addition of λ-carrageenan, phycocyanin containing spirulina-extract can be blended with anthocyanin based colors and deliver a stable color through thermal processing and through shelf life.

TABLE 11

Color stability of phycocyanin containing spirulina-extract with an anthocyanin based color in a hot fill pH 2.9 beverage

| 60000002 @ 0.5% + 15000001 @ 0.01% | Initial Color Before Hot fill | | | Δ E (color change) | | |
|---|---|---|---|---|---|---|
| | L* | a* | b* | post heat | 3 wks | 6 wks |
| Control | 76.63 | −10.32 | −21.64 | 12.6 | 23.0 | 26.9 |
| λ-carrageenan 0.05% | −85.33 | −7.72 | −7.58 | 1.5 | 2.9 | 5.2 |
| EDTA 30 ppm | 75.93 | −10.52 | −19.83 | 12.1 | 18.1 | 20.9 |
| λ-carrageenan 0.05% + EDTA 30 ppm | 85.27 | −7.74 | −7.53 | 1.5 | 2.2 | 2.8 |

Experiment 6

To determine whether the positive influence on color retention from λ-carrageenan and/or EDTA is specific to phycocyanin containing spirulina-extract or is applicable to other natural colors, an experiment was conducted with three different anthocyanins. EXBERRY® Shade Red 15000001 at 0.1%, EXBERRY® Elderberry 060036 at 0.083%, and EXBERRY® Shade Pink 80000002 at 0.083% were evaluated in a hot fill 7 brix beverage at pH 2.9. The addition of EDTA (disodium ethylenediaminetetraacetate) at 30 ppm and/or Ticaloid® 750 λ-carrageenan at 0.05 wt. % was varied to determine the influence on color retention. The beverages were analyzed by photometer before and after hot fill thermal processing (85° C. by microwave) and at week 3 and 6 after storage in 32° C. hotbox. A total of twelve samples were tested: control, λ-carrageenan, EDTA, and λ-carrageenan with EDTA for the three anthocyanin colors.

A Not a valid bookmark self-reference. 12 shows the CIE L*a*b* of the initial beverage. From the L*a*b* values, there is no color shift with the addition of λ-carrageenan as seen with beverages colored with phycocyanin containing spirulina-extract. In addition, λ-carrageenan, EDTA, and combination of λ-carrageenan with EDTA have little to no impact on stabilizing the color retention of three different anthocyanin based colors. For each anthocyanin based color, the ΔE between the control, λ-carrageenan, EDTA, and λ-carrageenan are similar.

This experiment provides supporting information that positive influence of λ-carrageenan and λ-carrageenan with EDTA is specific to phycocyanin containing spirulina-extract.

TABLE 12

Color stability of three different anthocyanin based colors in hot fill pH 2.9 beverage

| EXBERRY® Elderberry | Initial Color Before Thermal Processing | | | Δ E (color change) post | | |
|---|---|---|---|---|---|---|
| 060036 @ 0.083% | L* | a* | b* | heat | 3 wks | 6 wks |
| Control | 72.80 | 46.90 | 16.68 | 0.5 | 9.9 | 17.6 |
| λ-carrageenan 0.05% | 72.79 | 46.89 | 16.69 | 0.9 | 11.1 | 21.4 |
| EDTA 30 ppm | 70.65 | 48.19 | 19.28 | 0.5 | 9.1 | 16.0 |
| λ-carrageenan 0.05% + EDTA 30 ppm | 71.10 | 47.79 | 18.51 | 1.0 | 12.2 | 21.0 |

| Hot Fill Beverage pH 2.9, 7 brix | | | | | | |
|---|---|---|---|---|---|---|
| EXBERRY® Shade Red | Initial Color Before Thermal Processing | | | Δ E (color change) post | | |
| 15000001 @ 0.1% | L* | a* | b* | heat | 3 wks | 6 wks |
| Control | 73.89 | 50.26 | 8.39 | 0.6 | 7.7 | 11.6 |
| λ-carrageenan 0.05% | 73.10 | 51.38 | 9.04 | 2.1 | 7.2 | 13.6 |
| EDTA 30 ppm | 72.44 | 51.46 | 9.50 | 0.5 | 7.4 | 11.0 |
| λ-carrageenan 0.05% + EDTA 30 ppm | 72.43 | 51.36 | 9.38 | 0.2 | 8.5 | 15.4 |

| Hot Fill Beverage pH 2.9, 7 brix | | | | | | |
|---|---|---|---|---|---|---|
| EXBERRY® Shade Pink | Initial Color Before Thermal Processing | | | Δ E (color change) post | | |
| 80000002 @ 0.083% | L* | a* | b* | heat | 3 wks | 6 wks |
| Control | 72.16 | 61.23 | −9.78 | 0.6 | 6.1 | 5.6 |
| λ- carrageenan 0.05% | 72.16 | 61.23 | −9.77 | 0.1 | 5.3 | 6.8 |
| EDTA 30 ppm | 71.38 | 61.48 | −9.00 | 0.4 | 5.1 | 7.4 |
| λ-carrageenan 0.05% + EDTA 30 ppm | 68.63 | 66.14 | −8.06 | 0.6 | 5.1 | 7.3 |

Experiment 7

Experiment 7.1

A range of chelating agents were tested in a hot fill acidic beverage to determine if there was a positive impact to phycocyanin color stability similar to EDTA. Chelating agents tested were quercetin dihydrate at 10 ppm, grape seed extract at 10 ppm, glutathione at 75 ppm, and trisodium citrate at 250 and 500 ppm. Beverages comprised of phycocyanin containing EXBERRY® Shade Blue 60000002 at either 0.4 or 0.5 wt. %, 7 wt. % sucrose and citric acid. The level of citric add varied between 0.1 and 0.33 wt. % to achieve a constant pH of 2.9.

The beverages were analyzed by photometer before and after hot fill thermal processing (85° C. by microwave) and at week 3 and 6 after storage in 32° C. hotbox and results were compared to the control samples. Photometric results are in table 13 and data shows that the chelating agents tested had no positive impact to phycocyanin color stability. Color stability was either the same or slightly worse than control at the dosage levels tested.

TABLE 13

Impact of chelating agents on color stability of phycocyanin containing spirulina extract in hot fill pH 2.9 beverage
(Total Sum of Blue Absorbance)

| EXBERRY® SHADE BLUE 60000002@ 0.5 wt % | Before Heat | After Heat | T3 wk @ 32 C | T6 wk @ 32 C | % color loss |
|---|---|---|---|---|---|
| Control | 0.847 | 0.557 | 0.356 | 0.284 | 66.5% |
| Grape Seed Extract 10 ppm | 0.880 | 0.557 | 0.354 | 0.265 | 70.0% |
| Glutathione 75 ppm | 0.843 | 0.555 | 0.338 | 0.247 | 70.7% |
| Glutathione 25 ppm | 0.852 | 0.563 | 0.361 | 0.282 | 66.9% |
| Quercetin 10 ppm | 0.843 | 0.551 | 0.358 | 0.280 | 66.8% |

| EXBERRY® SHADE BLUE 60000002@ 0.4 wt % | Before Heat | After Heat | T3 wk @ 32 C | T6 wk @ 32 C | % color loss |
|---|---|---|---|---|---|
| Control | 0.730 | 0.423 | 0.334 | 0.265 | 63.7% |
| Trisodium Citrate 250 ppm | 0.690 | 0.553 | 0.322 | 0.247 | 64.2% |
| Trisodium Citrate 500 ppm | 0.691 | 0.598 | 0.284 | 0.191 | 72.3% |

Experiment 7.2

The chelating agent, sodium hexametaphosphate (SHMP) at 500 and 1000 ppm was tested in a hot fill acidic beverage to determine if there would be a positive impact to phycocyanin color stability. Beverages comprised of phycocyanin containing EXBERRY® Shade Blue 60000002 at 0.5 wt. %, 7 wt. % sucrose, 0.05 wt. % Ticaloid 750 lambda carrageenan, and 0.092 wt. % citric acid. The study had two controls, lambda carrageenan and lambda carrageenan with 30 ppm disodium EDTA. The pH of the samples varied from 2.9 to 3.2 as the addition of SHMP increased the pH.

The beverages were analyzed by photometer before and after hot fill thermal processing (85° C. by microwave) and at week 3 and 6 after storage in 32° C. hotbox and results were compared to the control samples. Photometric results are in table 14 and data shows that color stability with the addition of SHMP was about the same as the lambda carrageenan control but not as good as the lambda carrageenan with 30 ppm disodium EDTA control.

TABLE 14

Impact of SHMP on color stability of phycocyanin containing spirulina extract in an acidified hot fill beverage with lambda carrageenan
(Total Sum of Blue Absorbance)

|  | Before Heat | After Heat | T3 wk @ 32 C | T6 wk @ 32 C | % Color Loss |
|---|---|---|---|---|---|
| LC Control, pH 2.9 | 0.792 | 0.771 | 0.645 | 0.559 | 29% |
| LC + 30 ppm Disodium EDTA, pH 2.9 | 0.789 | 0.781 | 0.645 | 0.609 | 23% |
| LC + 500 ppm SHMP, pH 3.1 | 0.785 | 0.769 | 0.627 | 0.573 | 27% |
| LC + 1000 ppm SHMP, pH 3.2 | 0.773 | 0.744 | 0.601 | 0.544 | 30% |

LC: λ-carrageenan

Experiment 8

One of the challenges with using carrageenan to stabilize spirulina is the increase in viscosity of the solution which has an impact on mixing and flow properties. It has been observed in all hot fill experiments that the viscosity of a solution containing lambda carrageenan after thermal processing is reduced and has same viscosity of a solution with no carrageenan. The reduction in viscosity is due to the hydrolysis of carrageenan in acidic conditions which is well characterized in literature. The following experiment is to determine whether or not hydrolysis of carrageenan before the addition of spirulina will also stabilize spirulina.

A 1 wt. % λ-carrageenan solution was prepared using a blender at medium speed for 10 minutes. A portion of the 1 wt % λ-carrageenan solution was set aside for the control experiment. The remaining solution was acidified to pH 2.5 with citric acid, then placed in a water bath at 80° C. and 100 mL aliquots were removed after 5, 10, 15 and 30 minutes. All samples were cooled to room temperature in a cool water bath. Viscosity measurements were determined as described above with an Anton Paar device at 20° C. For reference purposes, the viscosity of a 1 wt % sucrose solution and tap water were measured.

TABLE 15

Viscosity of a non-degraded 1 wt % λ-carrageenan solution and hydrolyzed 1 wt. % λ-carrageenan solution (pH 2.5, 80° C. and various time intervals) before and after pH neutralization Average Viscosity Measurements - 1 wt. % Ticeloid® 750 hydrolyzed at pH 2.5 at 80° C.

Sample Viscosity [mPas]
Not degraded
151.5

|  | Viscosity [mPas] pH 2.5 | Reduction [%] | Viscosity [mPas] - after neutralization | Reduction [%] |
|---|---|---|---|---|
| Hydrolyzed T 0 min | 123.1 | 19 | 93.0 | 39 |
| Hydrolyzed T 5 min | 82.1 | 46 | 65.3 | 57 |
| Hydrolyzed T 10 min | 55.9 | 63 | 42.8 | 72 |
| Hydrolyzed T 15 min | 28.2 | 81 | 21.1 | 86 |
| Hydrolyzed T 30 min | 7.2 | 95 | 5.9 | 96 |
| 1% Sucrose | 1.2 | NA | NA | NA |
| Water | 1.1 | NA | NA | NA |

Viscosity results in table 15 shows an immediate reduction of viscosity with the addition of citric acid at pH 2.5. When exposed to heat, there is a significant drop in viscosity, 63% after 10 minutes and rate of viscosity reduction slows between 15 and 30 minutes.

The pH after neutralization was pH 5.5. The viscosity of the solution after neutralization with 2M NaOH solution was also measured and the viscosity decreased slightly due to the increase in water content which results in a lower carrageenan concentration. The viscosity of the solutions did not increase after neutralization which demonstrates that viscosity drop is due to hydrolyzation of multi-sulphated carrageenan and not a function of pH.

Based upon the results, the 10 and 30 minutes 1 wt. % λ-carrageenan hydrolyzed samples were tested in hot fill beverages.

As it is stated in the process description, spirulina phycocyanin needs to be stabilized with multi-sulphated carrageenan at pH above 5 before acid or acidic components are added. The acidic 10 and 30 minute hydrolyzed 1 wt. % λ-carrageenan samples were split and one portion was neutralized to a pH of 8 with 50% NaOH.

A total of five variables were tested in a hot fill beverage application: λ-Carrageenan Control, 10 & 30 minute Hydrolyzed (acid+heat), and 10 & 30 minute Hydrolyzed (acid+heat) then Neutralized. The dosage level of the different hydrolyzed λ-carrageenan solutions were adjusted to reach a final concentration of 0.05 wt % λ-carrageenan in a beverage. The remaining ingredients in the beverage formula were 7 wt % sucrose, 0.5 wt. % EXBERRY® Shade Blue liquid 60000202 (equivalent to 0.0155 wt % phycocyanin), and citric acid. Level of citric acid was adjusted to reach final beverage pH of 2.9. The five different beverages were thermally processed to 85° C. (microwave) and filled hot into PET bottles and cooled below 35° C. in a water bath.

After thermal processing and 1 week in 32° C. hot box, the control and 10 minute hydrolyzed+neutralized beverages were clear aqua blue with no precipitation. The 30 minute hydrolyzed+neutralized beverage was aqua blue with no precipitation but slightly turbid. The 10 and 30 minute hydrolyzed (acid+heat) were aqua blue but had significant precipitate after 1 week in 32° C. hot box. The samples were stored for 6 weeks in the hot box and measured for color retention. All samples were aqua blue and color loss ranged between 22-29%, however, the hydrolyzed λ-carrageenan solutions that were not neutralized prior to the addition of spirulina had significant precipitate (table 16).

TABLE 16

Total Sum of Blue Absorbance after thermal processing and 6 weeks in 32 C hot box

| | Sum of Blue Absorbance | | |
|---|---|---|---|
| | after heat | 6 wks @ 32° C. | Appearance |
| Lambda Carrageenan Control | 0.5544 | 0.3935 | Clear aqua blue |
| 10 min @ 85° C. hydrolysis (acidic) | 0.4217 | 0.3285 | Turbid aqua blue, precipitate |
| 10 min @ 85° C. hydrolysis (neutralized) | 0.5342 | 0.3964 | Clear aqua blue |
| 30 min @ 85° C. hydrolysis (acidic) | 0.5196 | 0.3724 | Turbid aqua blue, precipitate |
| 30 min @ 85° C. hydrolysis (neutralized) | 0.5556 | 0.4352 | Turbid aqua blue |

What is claimed is:

1. A liquid foodstuff comprising
   a. a *spirulina*-extract comprising phycocyanin,
   b. at least one multi-sulphated carrageenan and
   c. a solvent,
   wherein the amount of the at least one multi-sulphated carrageenan is between 0.005 and 0.6 wt. %,
   wherein the weight ratio between the at least one multi-sulphated carrageenan and the phycocyanin ranges between 1.5:1 and 200:1,
   wherein the liquid foodstuff has a pH between 2.0-4.6,
   wherein the solvent consists of water and optionally ethanol,
   wherein the amount of the solvent ranges between 75-99 wt. %,
   wherein the wt,% are relative to the total weight of the liquid foodstuff.

2. The liquid foodstuff according to claim 1, wherein the foodstuff contains other pigments selected from the group consisting of safflomin (safflower), anthocyanin, carotenoid, betanin, annatto, lycopene, curcumin and chlorophyll.

3. The liquid foodstuff according to claim 1, wherein phycocyanin content of the liquid foodstuff is between 0.003-0.15 wt. %.

4. The liquid foodstuff according to claim 1, wherein the liquid foodstuff has a solvent content of 75-99 wt.

5. The liquid foodstuff according to claim 1, wherein the liquid foodstuff contains between 0.1-40 wt. % ethanol.

6. The liquid foodstuff according to claim 1, wherein the liquid foodstuff is a juice, juice drink, sports drink, flavored tea, flavored water, carbonated beverage, non-carbonated beverage, nutritional drink, and/or alcoholic beverage.

7. The liquid foodstuff according to claim 1, wherein the liquid foodstuff contains dissolved multi-sulphated carrageenan.

8. The liquid foodstuff according to claim 1, wherein the at least one multi-sulphated carrageenan is selected from the group consisting of iota (ι)-carrageenan, delta (δ)-carrageenan, mu (μ)-carrageenan, theta (θ)-carrageenan, lambda (λ)-carrageenan and nu (ν)-carrageenan.

9. The liquid foodstuff according to claim 1, wherein the at least one multi-sulphated carrageenan is selected from the group consisting of a hydrolyzed product of iota (ι)-carrageenan, a hydrolyzed product of delta (δ)-carrageenan, a hydrolyzed product of mu (μ)-carrageenan, a hydrolyzed product of theta (θ)-carrageenan, a hydrolyzed product of lambda (λ)-carrageenan and a hydrolyzed product of nμ(ν)-carrageenan.

10. The liquid foodstuff according to claim 1, wherein the at least one multi-sulphated carrageenan content is between 0.01-0.50 wt. %.

11. The liquid foodstuff according to claim 1, wherein the at least one multi-sulphated carrageenan and the phycocyanin are present at a weight ratio between 2:1-100:1.

12. The liquid foodstuff according to claim 1, wherein a chelating agent is present between 1-2000 ppm in the liquid foodstuff.

13. The liquid foodstuff according to claim 12, wherein the chelating agents are selected from the group consisting of ethylene diamine tetra acetic acid and/or its Na, K or Ca salts and L-glutamic acid N,N-diacetic acid tetrasodium salt (GLDA).

14. The liquid foodstuff according to claim 13, wherein the ethylene diamine tetra acetic acid is present between 10-300 ppm.

15. The liquid foodstuff according to claim 13, wherein the ethylene diamine tetra acetic acid and the phycocyanin are present within the liquid foodstuff at a weight ratio between 4:1 — 1:200.

16. A process for making the foodstuff according to claim 1 comprising the steps:
   a. adding the at least ne multi-sulphated carrageenans in water and mixing until the at least one multi-sulphated carrageenan is dissolved, as determined by visual observation at a pH of at least 5;
   b. adding the phycocyanin, and mixing until dissolved;
   c. adding an acid or acidifying component;
   d. optionally adding a sweetener, flavor, vitamin, mineral, salt, buffer, juice, or other beverage components;
   e. optionally adding a chelating agent;
   f. optionally adding other pigments;
   g. Optionally adding an additive;
   h. adding the solvent to obtain the total volume;
   i. treating the mixture of a)-h) by either thermally processing the liquid to at least 65° C. and filling it into a container; or no thermal treatment and cold filling into a container, or combinations of the two.

17. The process according to claim 16, wherein step a) and b) of the process are carried out before any component is added that will destabilize the phycocyanin before it is dissolved with the at least one multi-sulphated carrageenan.

18. The liquid foodstuff according to claim 1, wherein the at least one multi-sulphated carrageenan is selected from the group consisting of iota (ι)-carrageenan and lambda (λ)-carrageenan.

19. The liquid foodstuff according to claim 1, wherein the at least one multi-sulphated carrageenan is lambda (λ)-carrageenan.

20. The liquid foodstuff according to claim 1, wherein the at least one multi-sulphated carrageenan is selected from the group consisting of a hydrolyzed product of iota (ι)-carrageenan and a hydrolyzed product of lambda (λ)-carrageenan.

21. The liquid foodstuff according to claim 1, wherein the at least one multi-sulphated carrageenan is a hydrolyzed product of lambda (λ)-carrageenan.

* * * * *